United States Patent Office 3,417,139
Patented Dec. 17, 1968

3,417,139
COUPLING COMPONENTS FOR AZO DYESTUFFS
Jack L. Towle, East Cleveland, and William H. Meek, Jr., Sagamore Hills, Ohio, assignors to Kewanee Oil Company, Bryn Mawr, Pa., a corporation of Delaware
No Drawing. Filed Dec. 19, 1966, Ser. No. 602,554
6 Claims. (Cl. 260—558)

ABSTRACT OF THE DISCLOSURE

This invention comprises new organic compounds useful as coupling components in the syntheses of azo disperse dyes. They can be prepared by reacting primary or secondary aliphatic amines with variously substituted N-β-carboalkoxyethylanilines.

---

This invention relates to new and novel organic compounds and more particularly to compounds that are useful as coupling components in the syntheses of azo disperse dyes.

The new compounds of the present invention can be defined by the following general formula:

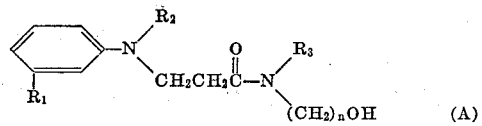

(A)

where $R_1$ is hydrogen or methyl radical; $R_2$ is an alkyl radical having 1 to 6 carbon atoms; $R_3$ is selected from the group consisting of hydrogen, an alkyl radical having 1 to 6 carbon atoms, or a hydroxy-terminated alkyl radical having 2 to 6 carbon atoms; and $n$ is an integer having value of 2 to 6 inclusive.

Representative coupling components of Formula A above which are useful intermediates in preparing a variety of azo dyestuffs can be:

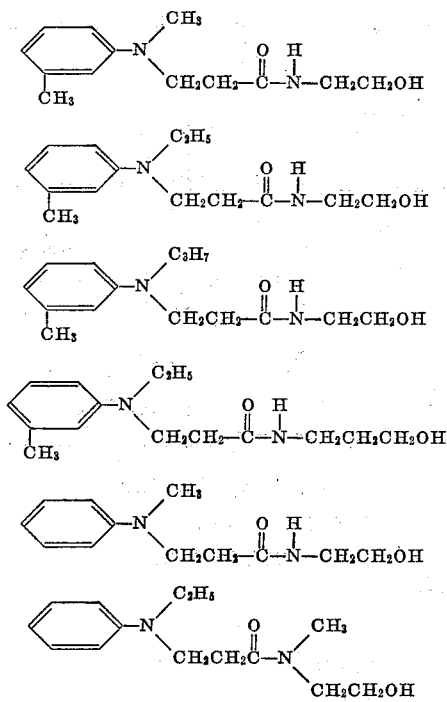

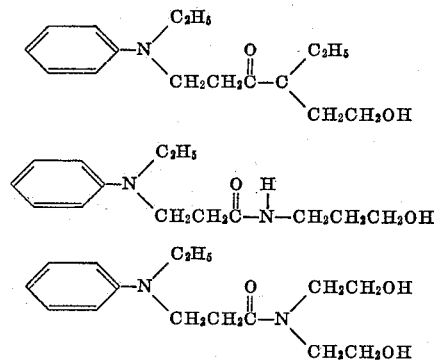

According to the present invention these new coupling components can be prepared by reacting primary or secondary aliphatic amines containing terminal hydroxy groups with variously substituted N-β-carboalkoxyethyl-anilines as shown in the following reaction:

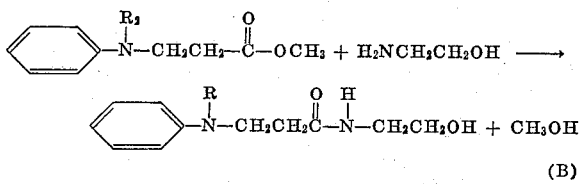

(B)

When reacted with suitable diazotized amines these new compounds form dyestuffs which possess very desirable properties such as brightness, resistance to gas-fading, dischargeability and good build-up on fibers such as acetate, triacetate, polyamide and polyester.

This invention will be more fully described by the following examples. The invention is not to be regarded, however, as restricted in any way by these examples and they are to serve merely as illustration. In these examples and throughout the specification, "parts" and "percentages" are given in weight unless specifically provided otherwise.

EXAMPLE I

To a 1-liter three-neck flask equipped with a stirrer, thermometer, reflux condenser, and an oil bath are charged 242.0 g. of N-ethylaniline (2.0 moles), 190.0 g. of methyl acrylate (2.2 moles), and 30.0 g. of glacial acetic acid. The mixture is heated at 100° C. for 72 hours and then fractionated under reduced pressure with a nitrogen bleed. The first fraction contains acetic acid and unreacted methyl acrylate which codistil at 28–35° C. and 50 mm. Hg. A second fraction of 15.0 g. of N-ethylaniline, boiling at 62–7° C. at 5 mm. Hg is collected. A third fraction weighing 352.0 g. of N-ethyl-N-β-carbomethoxy-ethylaniline (85% of theory) boiling at 112–14° C. and 1 mm. Hg is collected.

A mixture of 62.2 g. of N-ethyl-N-β-carbomethoxy-ethylaniline (0.3 mole) and 36.8 g. of ethanolamine (0.6 mole) was charged to a 250 ml. three-neck flask equipped with a magnetic stirrer, a thermometer, and a reflux condenser with a Dean-Sark trap. By means of an oil bath, the mixture was heated slowly to a maximum temperature of 150° C. During this period 9 ml. of methanol was collected. After heating the mixture for one hour at 150° C. the excess ethanolamine was distilled to a maximum hot temperature of 150° C. at 15 mm. Hg. By this method was obtained 68.7 g. (97% of theoretical of N-ethyl-N-β-[N′-(β′-hydroxyethyl)] carbamylethylaniline.

I.

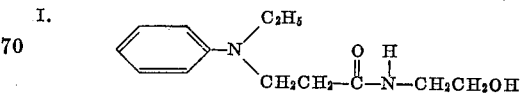

No further purification of the amber and viscous oil was attempted since the infrared spectrum showed the product to be free of ester groupings.

Other coupling components prepared in a manner similar to that disclosed in Example I are:

(II) N-ethyl-N-β[N'-(β'-hydroxyethyl)]carbamylethyl m-toluidine

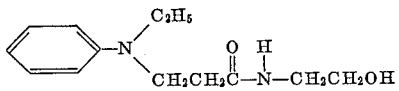

(III) N-ethyl-N-β-[N'-ethyl-N' (β'-hydroxyethyl)]carbamylethylaniline.

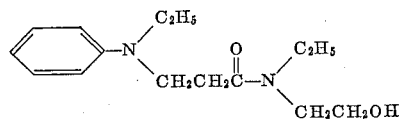

(IV) N-ethyl-N-β-[N'-ethyl-N'-(γ-hydroxypropyl)]carbamylethylaniline.

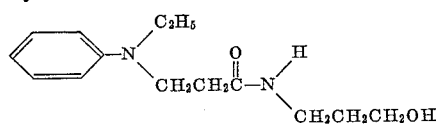

(V) N-ethyl-N-β-[N',N'-bis(β'-hydroxyethyl)]carbamylethylaniline.

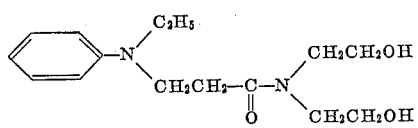

Compounds I to V when coupled with amine components such as 2-amino-5-nitrothiazole and 2-amino-6-methylsulfonylbenzothiazole form blue, violet, or cerise dyes. These dyes are found to have high tinctorial strength, superior sublimation properties and excellent gas-fastness and dischargeability.

The synthesis of a typical dyestuff incorporating one of the novel components of this invention can be effected according to the following procedure:

Diazotization

Nitrosyl sulfuric acid is prepared by the portionwise addition of 6.9 g. of sodium nitrite (0.1) mole to 45.6 ml. of 96% sulfuric acid at a rate to keep the temperature below 70° C. The solution is cooled to 10° C. and a mixture of 77.0 ml. of acetic acid and 14.0 ml. of propionic acid is added in portions at 10–15° C.

The resulting solution is cooled to 0° C. and 14.5 g. of 2-amino-5-nitrothiazole (0.1 mole) is added in portions over ½ hour at 0–3° C. After stirring for ¼ hour a mixture of 77.0 ml. of acetic acid and 14.0 ml. of propionic acid is added slowly at 0–5° C. The solution is stirred for ½ hour at 0° C. after which any excess nitrite is destroyed with urea.

Coupling

A solution of 23.6 g. of N-ethyl-N-β-[N'-(β'-hydroxyethyl)] carbamylethylaniline (0.1 mole) in 104.5 ml. of acetic acid and 166.0 ml. of propionic acid is cooled to 0° C. The cold diazonium solution is added in small portions over ¾ hour at 0–3° C. After stirring for ¼ hour anhydrous sodium acetate is added slowly until neutral to Congo red test paper. The viscous solution is stirred for ¾ hour at 0° C. and then poured into 2 liters of ice water with vigorous stirring. The precipitated dye is collected on a Büchner funnel and washed with fresh water to remove acid and other soluble impurities.

The product is a violet dye that builds well on acetate, triacetate, polyester and nylon.

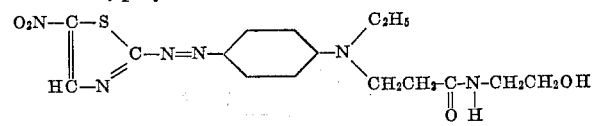

While certain features of this invention have been described in detail with respect to various embodiments thereof, it will, of course, be apparent that other modification may be made within the spirit and scope of this invention and it is not intended to limit the invention to the exact details shown above except insofar as they are defined in the following claims.

The invention claimed is:

1. A compound having the formula:

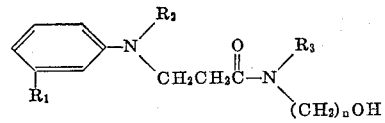

where $R_1$ is hydrogen or a methyl radical; $R_2$ is an alkyl radical having 1–6 carbon atoms; $R_3$ is selected from the group consisting of hydrogen, an alkyl radical having 1–6 carbon atoms and a hydroxy-terminated alkyl radical of from 2–6 carbon atoms, and $n$ is an integer having a value of at least 2 and no more than 6.

2. A compound of claim 1 having the formula:

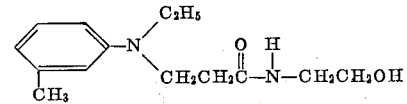

3. A compound of claim 1 having the formula

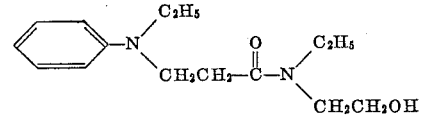

4. A compound of claim 1 having the formula

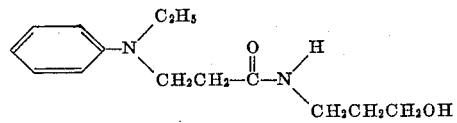

5. A compound of claim 1 having the formula

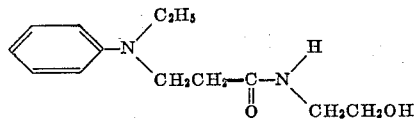

6. A compound of claim 1 having the formula

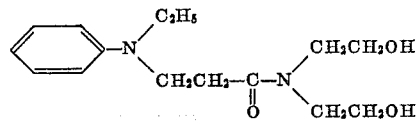

References Cited

UNITED STATES PATENTS 3,189,646  6/1965  Rainer _____ 260—558

HENRY R. JILES, *Primary Examiner.*

H. I. MOATZ, *Assistant Examiner.*

U.S. Cl. X.R.

260—158